United States Patent

Loukes

[15] 3,639,114
[45] Feb. 1, 1972

[54] METHOD OF RESHAPING AND ION-EXCHANGING GLASS

[72] Inventor: David G. Loukes, Prescot, England

[73] Assignee: Pilkington Brothers Limited, Liverpool, England

[22] Filed: May 7, 1969

[21] Appl. No.: 822,592

[30] Foreign Application Priority Data

May 14, 1968 Great Britain......................22,901/68

[52] U.S. Cl..........................................65/30, 65/77, 65/104, 65/268, 65/275
[51] Int. Cl.....................................C03b 23/00, C03c 21/00
[58] Field of Search....................65/30, 60, 68, 77, 102, 104, 65/268, 275, 285

[56] References Cited

UNITED STATES PATENTS

| | | | |
|---|---|---|---|
| 1,592,429 | 7/1926 | Kraus | 65/60 X |
| 2,707,688 | 5/1955 | Blackman | 65/30 X |
| 3,218,220 | 11/1965 | Weber | 65/30 X |
| 3,450,581 | 6/1969 | Shortes | 148/187 |
| 3,502,022 | 3/1970 | Wood | 101/129 |
| 3,244,497 | 4/1966 | Copeland | 65/356 X |

Primary Examiner—Arthur D. Kellogg
Attorney—Morrison, Kennedy & Campbell

[57] ABSTRACT

A molded glass article is produced by pressing a body of molten glass which is sufficiently hot to be electrically conductive between two complementary mold parts to produce an article of a required shape, and passing an electric current through the glass between solid electrically conductive electrodes in direct contact with the molded faces of the glass to impart a desired surface characteristic to at least one of the molded faces of the glass.

4 Claims, 3 Drawing Figures

PATENTED FEB 1 1972
3,639,114
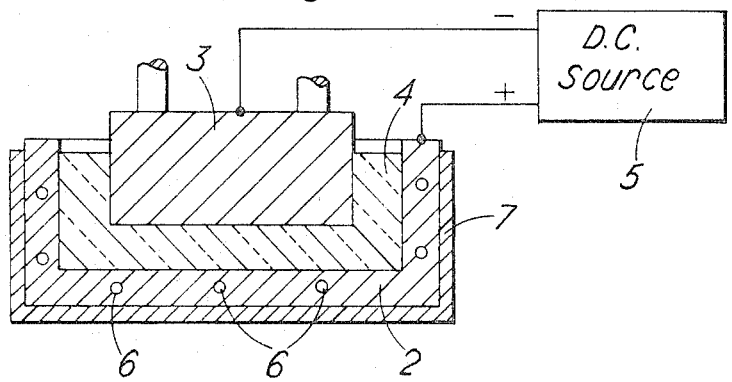
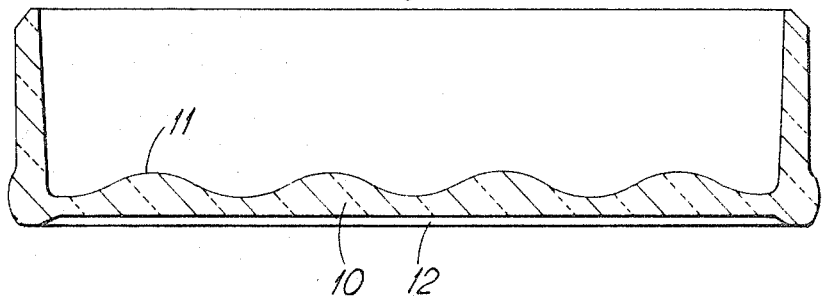
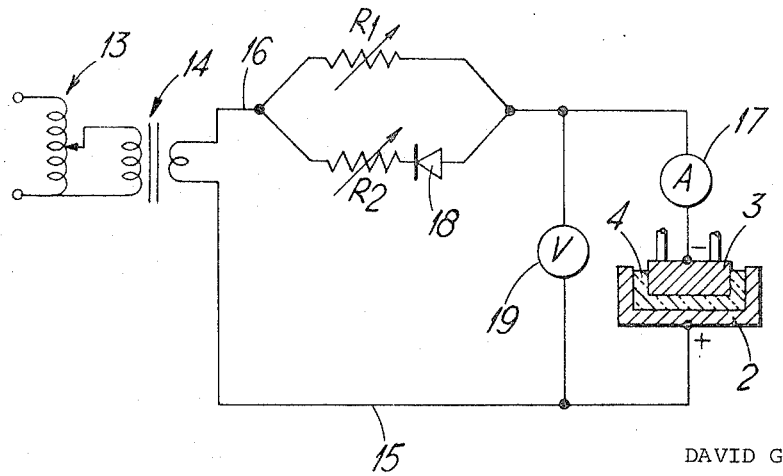
Inventor
DAVID GORDON LOUKES
By Morrison, Kennedy & Campbell
Attorneys

METHOD OF RESHAPING AND ION-EXCHANGING GLASS

BACKGROUND OF THE INVENTION

This invention relates to the production of moulded glass articles. The invention is particularly, but not exclusively, applicable to the manufacture of glass articles having predetermined surface characteristics other than those inherent in the method of forming the articles.

SUMMARY

According to the present invention in one aspect thereof a method of producing a moulded glass article comprises pressing a body of molten glass which is sufficiently hot to be electrically conductive between two complementary mould parts to produce an article of a required shape, and passing an electric current through the glass between solid electrically conductive electrodes in direct contact with the moulded faces of the glass to impart a desired surface characteristic to at least one of the moulded faces of the glass.

The solid electrodes may be metallic or may be formed of carbon. Conveniently, the mould parts are electrically conductive and themselves constitute the two electrodes.

Alternating current may be passed through the glass to effect heating or treatment of the moulded article. Where a direct current is passed between the electrodes, surface treatment of the moulded glass may be effected by forming the positive electrode of, or including in the positive electrode, an element which is capable of producing a required surface characteristic when incorporated in the glass, said element forming positive ions which enter the glass surface upon passage of the current.

The positive electrode may comprise or contain cobalt, copper, gold, iron, nickel or silver.

The invention also provides apparatus for producing a moulded glass article, said apparatus comprising two relatively movable mould parts having complementary mould surfaces, means for introducing molten glass to be moulded between the mould parts, solid electrically conductive electrodes adapted to make direct contact with the moulded faces of the glass, and an electrical current source connected to said electrodes for passing a current through the moulded glass between the electrodes to impart a desired surface characteristic to at least one of the moulded faces of the glass.

The mould parts may be electrically conductive and themselves constitute the two electrodes.

One or both of the mould parts may be provided with internal channels for the circulation of a coolant fluid, for example, water.

The invention further comprehends a moulded glass article having desired surface characteristics produced by the method as hereinbefore described.

BRIEF DESCRIPTION OF THE DRAWINGS

The invention will be more clearly understood from the following description, given by way of example, with reference to the accompanying drawings in which:

FIG. 1 is a diagrammatic cross section by way of example, through a glass moulding apparatus according to the invention.

FIG. 2 is a sectional elevation through the glass half-brick treated in Example I, and FIG. 3 illustrates a circuit for obtaining the direct current component of the electrolytic process used in Example II.

DESCRIPTION OF THE PREFERRED EMBODIMENT

FIG. 1 illustrates a mould for forming hollow glass articles in the form of half-bricks.

A gob of glass to be moulded is delivered from a furnace (not shown) in conventional manner at a temperature of the order of 950° C., at which temperature the glass is at a suitable viscosity of moulding and is also electrically conductive.

The hot glass is moulded between two mould parts having complementary mould surfaces conforming to the required shape of the glass article to be moulded. The two mould parts are operated at conventional mould temperatures for the particular material from which the mould parts are formed, that is in the case of the mould parts being formed of carbon or cobalt, up to temperatures of the order of 600° C. The mould parts may be protected by a nonoxidizing atmosphere.

In the illustrated embodiment the mould comprises a horizontally disposed outer mould part 2 formed of cobalt and an inner mould part 3, shown as a plunger of iron or carbon, which is mounted on a conventional press (not shown) for movement vertically relative to the outer mould part 2. The gob of molten glass is delivered into the lower mould part 2, when the plunger 3 is retracted, and then the press is operated to force the plunger into the molten glass in the mould so that when the mould parts 2 and 3 are in their closed position, as shown, the molten glass is pressed to the desired shape, as indicated at 4.

The outer and inner mould parts 2 and 3 are connected to he positive and negative terminals respectively of a direct current electrical power source 5, so that the outer mould part 2 is an anode and the inner mould part 3 a cathode of an electrolytic circuit, the glass 4 being the electrolyte. Positive ions, in this case cobalt ions, pass from the surface of the outer mould part 2 which is contacted by the glass into the exterior face of the glass article as it is being formed and impart a surface characteristic (in this case, a blue tint) to the outer face of the glass.

It is expedient to use the mould parts 2 and 3 as the anode and cathode respectively for the electrolytic treatment of the glass as it is being moulded into a finished article, an alternative method is to perform the electrolytic treatment after moulding but while the moulded glass article is still hot, by placing separate electrically conductive electrodes which are shaped to match intimately the dimensions of the moulded article in direct contact with the moulded glass surfaces.

The outer mould part 2 is provided with internal passages 6 for the circulation of a coolant fluid, conveniently water. In the course of time the outer mould part 2, or the positive electrode, is consumed and requires replacement. To facilitate this the mould part 2 is preferably in the form of a replaceable lining to a metallic mould shell 7.

The inner mould part 3, or negative electrode, acquires during the electrolytic process a coating of sodium metal due to the neutralization of sodium ions which migrate from the glass. From time to time, or between successive moulding operations, this sodium coating is removed by heating the mould part 3 to vaporize the sodium.

Examples of other metals which may be used as, or included in, the outer part 2 (or positive electrode) to produce surface modification of the glass by incorporation therein are: copper, gold, iron, nickel and silver.

Use of any one of these metals imparts a different color to the treated surface. Also, in the case of a glass article having a surface treated with copper by the above described electrolytic process, subsequent heating of the article in an oxidizing atmosphere, for example at 600° C. converts the blue electrolytic copper ions into a blue/green mixture of cuprous and cupric ions. On the other hand, subsequent heating of the electrolytically treated article in a reducing atmosphere, again at 600° C., converts the electrolytic copper ions into red colloidal particles of copper.

If the article is treated electrolytically to cause migration of gold, nickel, silver or cobalt ions into the glass, subsequent heating in a reducing atmosphere, e.g., 90 percent nitrogen, 10 percent hydrogen, converts these metal ions in the glass into colloidal form, giving respectively a red, grey/brown, yellow or grey color to the glass.

Although the process specifically illustrated related to the surface treatment of the external surface of the moulded glass article, the interior surface of the article can equally well be treated by providing an inner mould part 3 of suitable material for modifying the interior surface and making the inner mould part 3 the anode and the outer mould part 2 the cathode of the electrolytic circuit.

Also, the inner mould part 3 may be provided with internal passages 6 for the circulation of a coolant fluid.

As an alternative to passing direct current through the glass, an alternating current could be passed therethrough for effecting surface treatment of both the interior and exterior faces of the moulded glass article concurrently.

A heating alternating current may be passed through the glass, e.g., by injecting the alternating current into the direct current supply.

Any article of pressed ware may be produced with a desired surface finish by the method of the invention, for example a moulded glass insulator can be produced with a metallic finish giving a desired surface resistivity to the insulator.

Two specific examples of the electrolytic process described above will now be described.

Example I

This example concerned the electrolytic treatment of the outside surface of the glass half-brick shown in FIG. 2. This half-brick is 19 cm. square and 5 cm. thick. The base 10 of the half-brick has a minimum thickness of 6 mm. and the inside surface of the base has ribs 11. The outside surface of the base 10 is formed with a 3 mm. deep recess 12. The total outside area of the half-brick to be contacted by the anode is about 741 sq. cm.

In order to impart a cobalt blue color with 65 percent light transmission, to the outside surface of the half-brick, it has been found that a current density of 1 coulombs/3 sq. cm. is required. In this case, therefore, about 247 coulombs were required.

The electrolytic process was switched on for 30 seconds with the applied voltage automatically adjusted to apply 7.5 amps. The actual voltage was initially 2 volts but rose during the operation of the process 10 volts due to polarization effects building up in the glass surface being treated and due to cooling of the glass.

The glass temperature at the beginning of the process was 950° C. and at the end of the process it had dropped to 800° C.

The plunger 3 and the mould 2 were both provided with internal channels 7 for the circulation of cooling air. However, the cooling air was only switched on after the completion of the electrolytic process. The glass temperature then fell to about 600° C. after about 3 minutes. The plunger 3 was then withdrawn and the treated glass half-brick was removed from the mould 3.

The half-brick was transferred to a welding station and immediately welded to a second glass half-brick which had been similarly treated. The total effective light transmission of the colored brick was then 65 percent × 65 percent which equals 42 percent.

Example II

This example concerns an equivalent glass half-brick to that employed in Example I. However, in this case, the half-brick was heated by alternating current superimposed on the direct electrolytic current. The temperature of the glass was thus maintained at 950° C., thereby allowing the electrolytic process to be carried out more quickly without severe polarization effects building up, even though the plunger 3 and the mould were, in this example, internally water cooled.

At the completion of the electrolytic process, the glass temperature fell to 500° C. in about 1 minute, this being due to the more efficient water cooling. Also, in this case, the water cooling was employed throughout the electrolytic process. The mould and plunger surfaces were thus cooler and it was also found that there was a greatly reduced tendency for the glass to adhere to the mould or to the plunger. Indeed, the glass half-brick was readily removed from the mould at 500° C.

In this example, the alternating current was 590 amps at 18 volts and the direct current was 49 amps at 45 volts. The electrolysis time was 5 seconds.

A typical electrical supply circuit as illustrated in FIG. 3. In this circuit, a supply is fed to a variable autotransformer 13 which is connected to the primary winding of a second transformer 14 which is capable of delivering high currents at relatively low voltages. One end of the secondary winding of the transformer 14 is connected to the mould 2 by a line 15, and the other end of the secondary winding is connected by a line 16 to the plunger 3. Two variable resistors $R_1$, $R_r$ are connected in parallel with each other and in series with the plunger. A diode rectifier 18 is connected in series with the resistor $R_2$ and an ammeter 17 is connected in series with both the resistors $R_1$, $R_2$ and the plunger 3. A voltmeter 19 is connected across the lines 15, 16. If desired, either or both the ammeter 17 and the voltmeter 19 could be connected between the transformer 14 and the resistors $R_1$, $R_2$ instead of between the resistors and the plunger 3, as shown.

Adjustment of resistor $R_2$ controls the electrolytic direct current component flowing through the glass, and adjustment of the resistor $R_1$ controls the heating alternating current component.

We claim:

1. Apparatus for producing a moulded glass article, said apparatus comprising two relatively movable, electrically conductive, mould parts constituting electrodes and having complementary the mould parts, means for causing relative movement between said mould parts to deform said glass so as to shape the article to a predetermined form, and an electrical current source connected to said electrodes for passing a current through the moulded glass between the electrodes to impart a desired surface characteristic to the moulded face of the glass in contact with said one of the mould surfaces by ion-exchange material into said moulded glass face.

2. A method of producing a moulded glass article and imparting a desired surface characteristic to at least one moulded surface thereof, the method comprising:

applying solid electrically conductive surfaces, at least one of which is formed with ion-exchange material, to heat softened glass disposed between said surfaces with a force sufficient to deform the glass so as to shape the article to a predetermined form; and passing an electric current between said ion-exchange material surface and the heat softened glass, while the glass remains in a heat softened state and while said solid electrically conductive surfaces remain in contact with the deformed glass, so as to effect an ion-exchange material into a surface of said deformed glass in contact therewith.

3. A method according to claim 2, in which said ion-exchange material is a metal selected from the following group: cobalt, copper, gold, iron, nickel and silver.

4. A method of producing a moulded glass article and imparting a desired surface characteristic to at least one moulded surface thereof, the method comprising:

applying solid electrically conductive surfaces, at least one of which is formed with ion-exchange material, to heat softened glass disposed between said surfaces with a force sufficient to deform the glass so as to shape the article to a predetermined form; and simultaneously passing a direct electric current in a direction from said ion-exchange material surface into the heat softened glass so as to effect an ion-exchange from said ion-exchange material into a moulded surface of the glass article in contact therewith.

* * * * *

UNITED STATES PATENT OFFICE
CERTIFICATE OF CORRECTION

Patent No. 3,639,114            Dated February 1, 1972

Inventor(s) David G. Loukes

It is certified that error appears in the above-identified patent and that said Letters Patent are hereby corrected as shown below:

IN THE CLAIMS

Column 4, line 29 before "the mould parts" insert --mould surfaces, at least one of said mould surfaces being formed with ion-exchange material, means for introducing molten glass to be moulded between--.

Column 4, line 36 after "exchange" insert --from said ion-exchange--.

Column 4, line 50 before "material" insert --from said ion-exchange--.

Signed and sealed this 19th day of February 1974.

(SEAL)
Attest:

EDWARD M. FLETCHER, JR.            C. MARSHALL DANN
Attesting Officer                      Commissioner of Patents